(12) United States Patent
Pinto

(10) Patent No.: US 10,045,492 B2
(45) Date of Patent: Aug. 14, 2018

(54) CONTAINER FOR CULTIVATING PLANTS, ESPECIALLY HERBS

(71) Applicant: Innovartis GmbH, Bremerhaven (DE)

(72) Inventor: Hardy Cruz Pinto, Cottbus (DE)

(73) Assignee: Innovartis GmbH, Bremerhaven (DE)

(*) Notice: Subject to any disclaimer, the term of this patent is extended or adjusted under 35 U.S.C. 154(b) by 115 days.

(21) Appl. No.: 14/738,956

(22) Filed: Jun. 15, 2015

(65) Prior Publication Data

US 2016/0165807 A1 Jun. 16, 2016

(30) Foreign Application Priority Data

Dec. 15, 2014 (DE) .................. 40 2014 101 215

(51) Int. Cl.
*A01G 27/06* (2006.01)
(52) U.S. Cl.
CPC .................. *A01G 27/06* (2013.01)
(58) Field of Classification Search
CPC ............. A01G 9/00; A01G 9/02; A01G 9/023
USPC .......... 47/65.5, 65.7, 66.1, 68, 86, 87, 41.01
See application file for complete search history.

(56) References Cited

U.S. PATENT DOCUMENTS

| 4,198,784 A * | 4/1980 | Sukert ............... | A01G 27/04 47/79 |
| 4,346,532 A * | 8/1982 | Peterson ............ | A01G 9/02 47/66.5 |
| 4,356,665 A * | 11/1982 | de Oliveira ........ | A01G 27/04 47/80 |
| 5,806,242 A * | 9/1998 | Park .................. | A01G 27/06 47/79 |
| 2015/0013222 A1* | 1/2015 | Su .................... | A01G 27/02 47/65.5 |

FOREIGN PATENT DOCUMENTS

| CN | 00202617884 U | 12/2012 |
| DE | 202006018133 U1 | 4/2008 |
| TW | M434434 U1 | 8/2012 |

OTHER PUBLICATIONS

"Vietnam outdoor ceramic pots," available at https://outdoorceramicpots.wordpress.com/tag/vietnam-large-outdoor-ceramic-pots/.*

* cited by examiner

*Primary Examiner* — Lisa L Tsang
(74) *Attorney, Agent, or Firm* — Michael Soderman

(57) ABSTRACT

Containers for cultivating plants, especially herbs. The containers distinguish themselves, in particular, by the fact that plants can be supplied with water over a longer period of time without the culture substrate becoming waterlogged. In addition, the container is comprised of at least one pot in the form of a first part and a second part made of ceramic with at least one step. The second part has, one after the other, an unglazed base, a first pipe section that is not glazed, at least on the inside, a glazed disk with a hole and a glazed second pipe section; the cross section of the first pipe section is smaller than the cross section of the second pipe section.

7 Claims, 6 Drawing Sheets

CONTAINER FOR CULTIVATING PLANTS, ESPECIALLY HERBS

CROSS-REFERENCE TO RELATED APPLICATIONS

This application claims the benefit under 35 USC 119 of German Application No. DE 402014101215.6 filed on Dec. 15, 2014; this application is incorporated by reference herein in its entirety.

BACKGROUND

The invention relates to containers for cultivating plants, especially herbs.

A culture vessel for culinary herbs that has a two-piece design is known from the document DE 20 2006 018 133 U1. It is comprised of a flat base and a stepped, cylindrical upper section. The water reservoir in the flat base is bounded.

The document CN 202 617 884 U involves a multi-piece flower pot. It is essentially comprised of a pot for holding water, a vessel for the culture substrate and a hollow body with a closure for conveying water. The water is exclusively conveyed through the hollow body. In addition, the hollow body projects through both the cover plate of the pot and the base of the vessel; the vessel is loosely set on the cover plate of the pot. Water can also get to the outside via the capillary effect between the pot and the vessel, so water that is conveyed does not completely go into the culture substrate. Furthermore, the surface for delivering water to the culture substrate is bounded by the hollow body.

SUMMARY

The invention relates to containers for cultivating plants, especially herbs. The containers distinguish themselves, in particular, by the fact that plants can be supplied with water over a longer period of time without the culture substrate becoming waterlogged.

In addition, the container is comprised of at least one pot in the form of a first part and a second part made of ceramic with at least one step. The second part has, one after the other, an unglazed base, a first pipe section that is not glazed, at least on the inside, a glazed disk with a hole and a glazed second pipe section; the cross section of the first pipe section is smaller than the cross section of the second pipe section. Furthermore, the first pipe section with the base is arranged in the pot and the disk with the second pipe section is arranged over the pot. Moreover, there is water in the pot that constitutes a first part and culture substrate in the second part.

DETAILED DESCRIPTION

The main embodiment is based on the task of supplying water to seeds and plants in a container over a long period of time in such a way that the culture substrate does not become waterlogged.

This problem is solved with the features specified below.

The containers for cultivating plants, especially herbs, distinguish themselves, in particular, by supplying plants with water over a longer period of time without the culture substrate becoming waterlogged.

In addition, the container is comprised of at least one pot constituting a first part and a second part made of ceramic with at least one step. The second part has, one after the other, an unglazed base, a first pipe section that is not glazed, at least on the inside, a glazed disk with a hole and a glazed second pipe section; the cross section of the first pipe section is smaller than the cross section of the second pipe section. Furthermore, the first pipe section with the base is arranged in the pot and the disk with the second pipe section is arranged over the pot. Moreover, there is water in the pot that constitutes a first part and culture substrate in the second part.

The base is therefore completely in the water, and the first pipe section is in the water in certain places. The base and at least the inner wall of the first pipe section are not glazed and therefore porous. Water flows out of the pot into the substrate via these pores. As is generally known, that is brought about by the surface tension of the water and the interfacial tension between the water and the base including the first pipe section. The culture substrate is therefore moistened in a targeted way without the culture substrate becoming waterlogged. Seed compost or plant soil can be used as a culture substrate. The disk and the second pipe section are glazed, so water cannot get out through them. Evaporation of water in these areas and therefore increased water consumption are prevented.

Further, the second part closes up the pot with the water. Evaporation of water, which takes place in the case of an open pot, does not arise, so there is a longer supply of the plants or seeds with one filling.

The container is therefore especially suitable for germination and the growing of plants. Moreover, the container can be used in an advantageous way for small plants such as herbs. The container can therefore be used, in particular, for culinary herbs.

Advantageous embodiments of the invention are specified in subordinate claims.

In a further embodiment, the pot is made of a ceramic or plastic.

In another embodiment, the pot is made, at least in certain areas, of plastic that is transparent for visible light. The filling level of the water in the pot can therefore be easily checked from the outside with an assembled container.

A further embodiment specifies that the second part has a first pipe section that is not glazed on the inside and glazed on the outside. Water flows in a targeted way through the base and the inner wall of the first pipe section to the culture substrate in the second part.

An element pointing in the direction of the pot floor that is made of an unglazed ceramic is arranged at the base of the second part in another embodiment. The surface for water to be conveyed is enlarged.

The element at the base of the second part is, in accordance with a different embodiment, a third pipe section pointing in the direction of the pot floor. The cross section of the third pipe section is smaller than the cross section of the first pipe section. Furthermore, the third pipe section is made of an unglazed ceramic. When the pot is filled with water, the third pipe section is therefore located in this pot. The flow is increased without the culture substrate being able to become waterlogged.

A further embodiment specifies that there is at least one opening in the wall of the third pipe section. Moreover, enclosed air can escape in an advantageous way when the second part is inserted so that the porous components of the second part are completely wet down.

The second part with the element is designed in one piece in another embodiment.

In yet another embodiment, a spacing ring is located on the pot and therefore between the pot as the first part and the disk with the second pipe section of the second part. It improves the grip of the second part on and in the pot as the first part. At the same time, it is a seal between the pot and the second part.

Finally, the container can have a round or polygonal cross section.

An example of the invention is shown in the drawings in the form of its basic structure in each case, and it will be described in more detail below.

BRIEF DESCRIPTION OF THE DRAWINGS

The following are shown in the figures.

DETAILED DESCRIPTION OF THE PREFERRED EMBODIMENTS

A container for cultivating plants 3, especially herbs, is essentially comprised of a pot 1 as a first part, a second part 2 and a spacing ring 4.

Figure 1A:
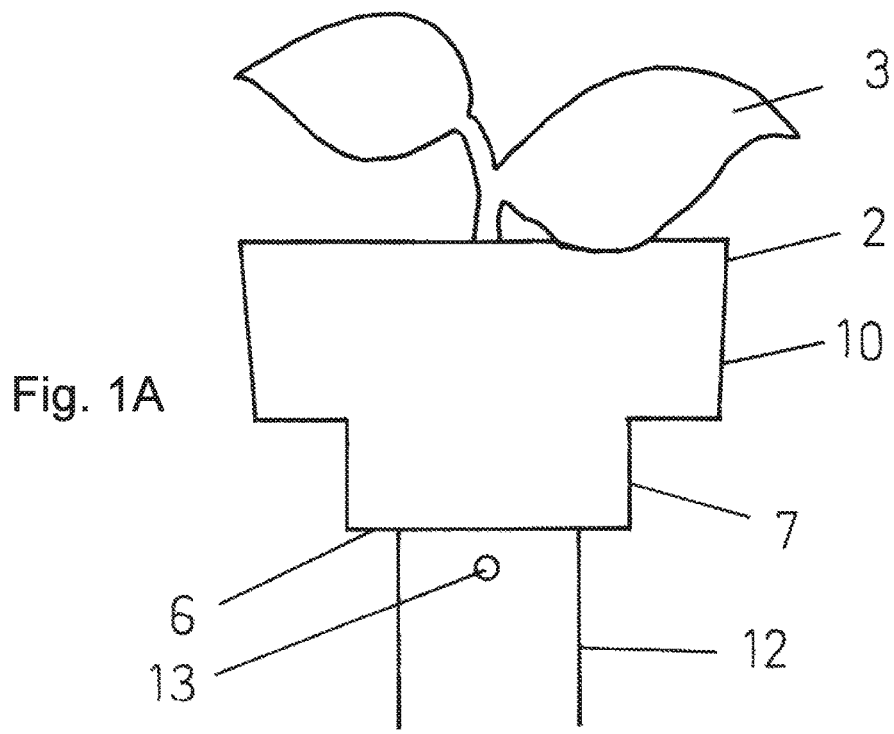
FIG. 1A shows the upper parts of a container for cultivating plants, especially herbs,
FIG. 1 B shows a pot with water.
Figure 1B:
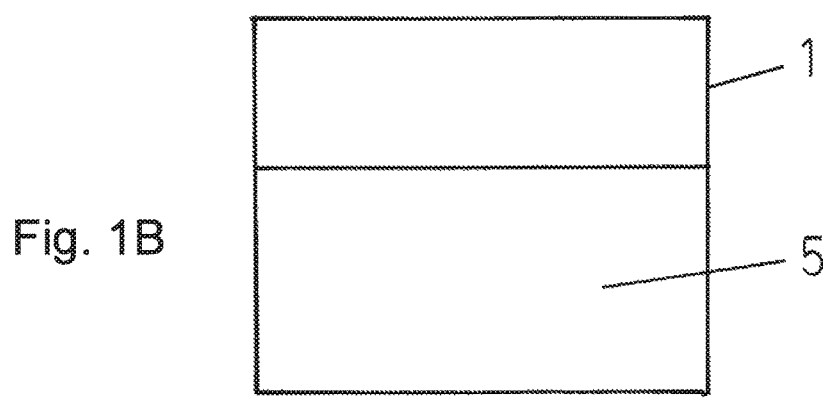

FIG. 1 shows the parts of a container for cultivating plants 3, especially herbs, in a basic diagram.

The pot 1 as the first part for holding water 5 is comprised of a plastic that is transparent to visible light, at least in sections. In addition, transparent strips could exist so that the filling level can be checked. Non-transparent strips serve in the visual design of the pot 1.

The second part 2 is an insert/upper part for the pot 1 and is comprised of a ceramic. This second part 2 is designed with steps. In addition, the second part 2 has, one after the other, an unglazed base 6, a first pipe section 7 that is not glazed, at least on the inside, a glazed disk 8 with a hole 9 and a glazed second pipe section 10. The first pipe section 7 can, moreover, be a first pipe section 7 that is unglazed on the inside and glazed on the outside. The cross section of the first pipe section 7 is smaller than the cross section of the second pipe section 10. The base 6, the first pipe section 7, the disk 8 and the second pipe section 10 form the boundary of a hollow area to hold the culture substrate 11 with the plant 3 or the seeds. Furthermore, a third pipe section 12 pointing in the direction of the pot floor is arranged on the base 6 of the second part 7; the cross section of the third pipe section 12 is smaller than the cross section of the first pipe section 7. The third pipe section 12 is comprised of an unglazed ceramic. At least one opening 13 can be located in the wall of the third pipe section 12. The second part 2 with the third pipe section 12 is designed in one piece, so the third pipe section 12 is a fixed component of the second part 2.

Figure 2:
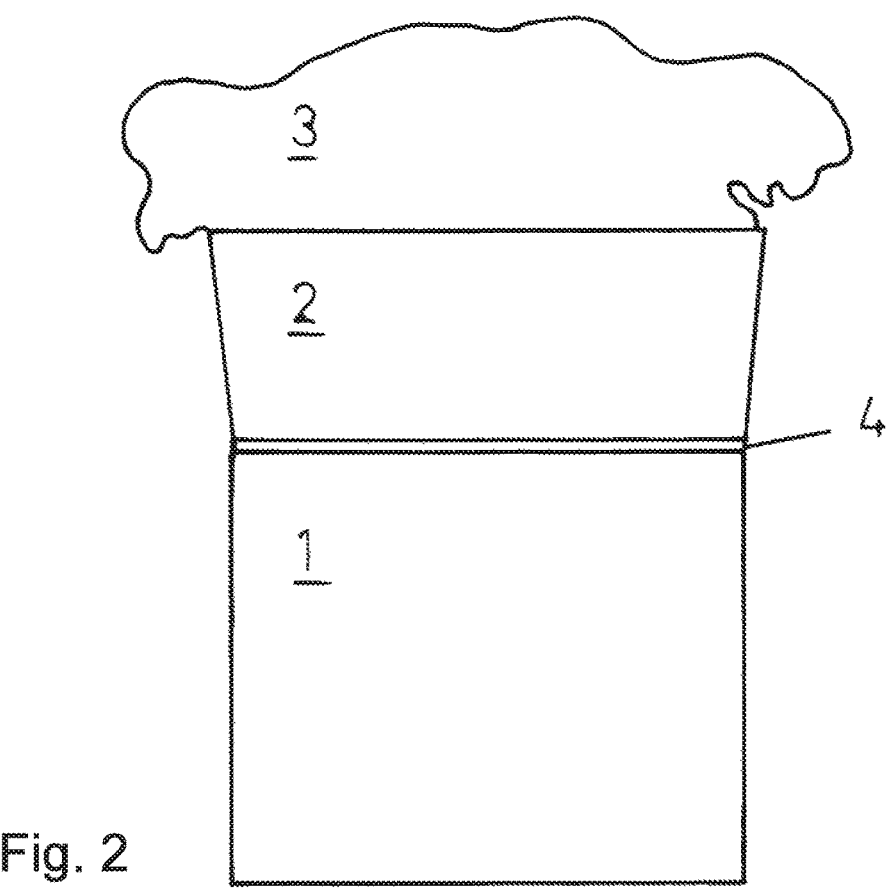
FIG. 2 shows an assembled container.

FIG. 2 shows an assembled container in a basic diagram.

The spacing ring 4 is located on the pot 1 and therefore between the pot 1 as the first part and the disk 8.

When assembled, the third pipe section 12 and the first pipe section 7 with the base 6 are arranged in the pot 1 and the disk 8 with the second pipe section 10 is arranged over the pot 1.

The container has a round or polygonal cross section.

Figure 3:
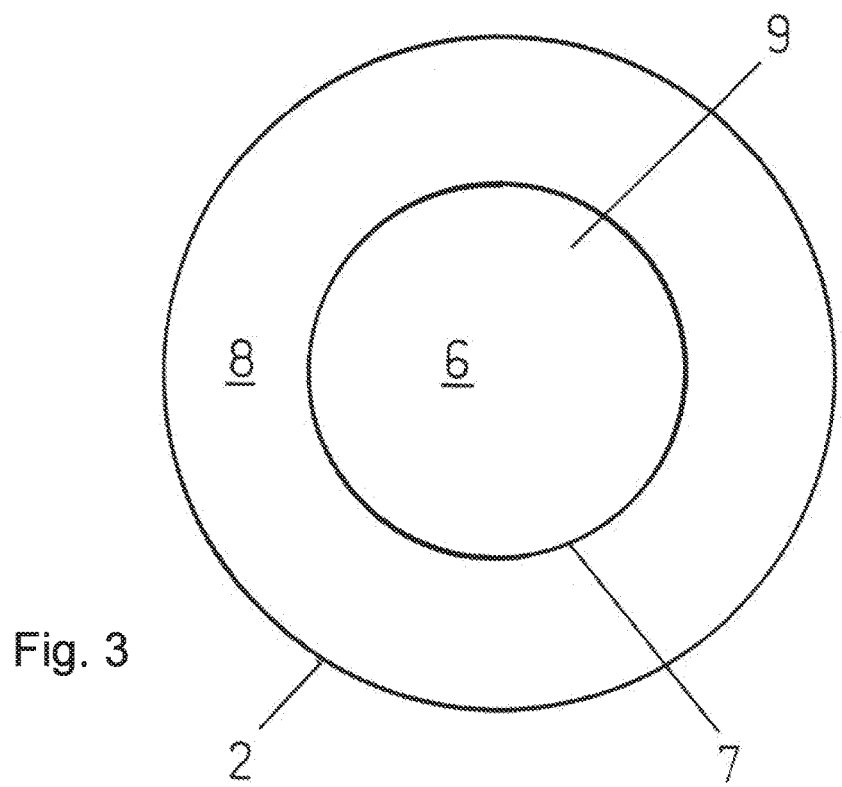
FIG. 3 shows a view into the bottom of the second part.
Figure 4:
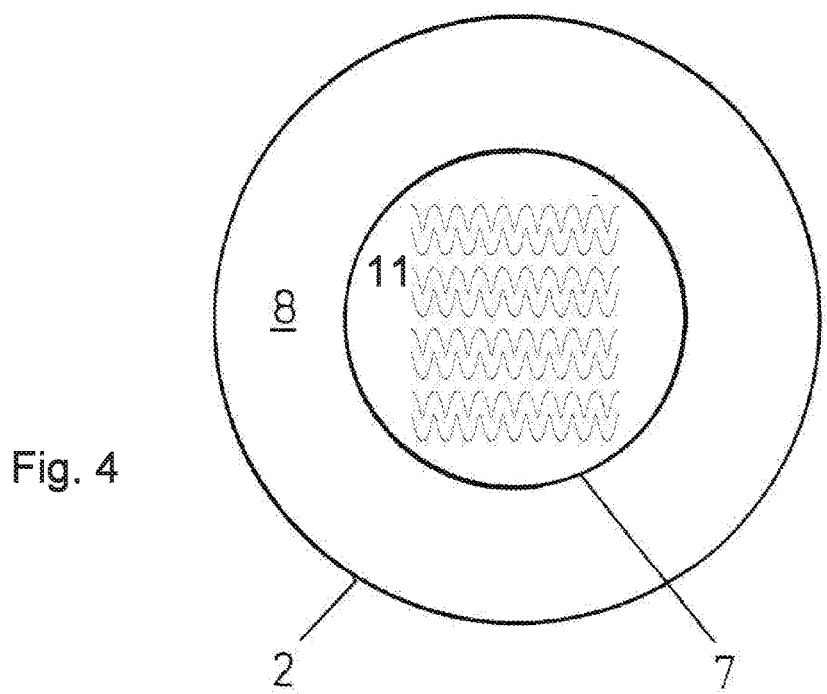
FIG. 4 shows the culture substrate in a view from the top into the upper part of a container for cultivating plants, especially herbs.
Figure 5:
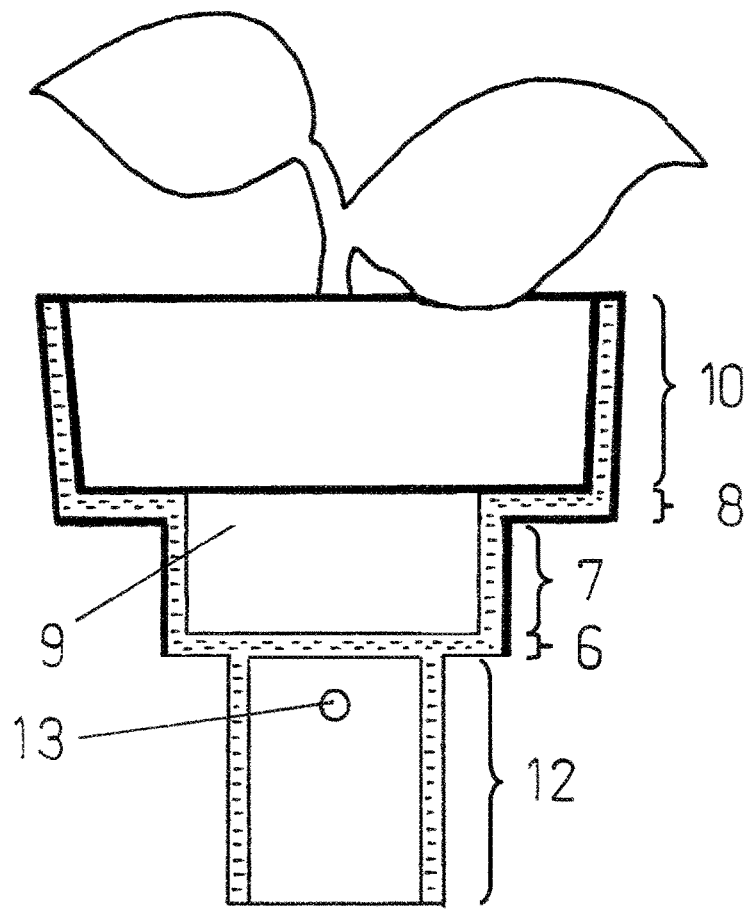
FIG. 5 shows a view in accordance with FIG. 1A with some of the surface cut away, the bolder lines indicating glazed surfaces.
Figure 6:
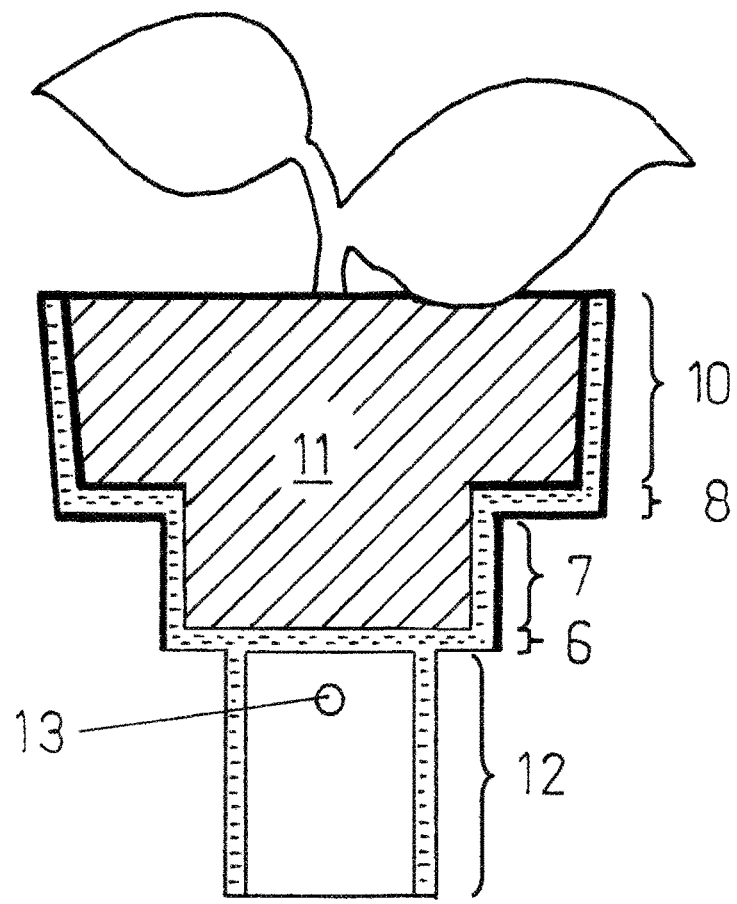
FIG. 6 shows a sectional view of FIG. 1A cut through the upper parts of a container for cultivating plants, especially herbs, with the bolder lines indicating glazed surfaces.

FIG. 3 shows the second part viewed from the bottom.

LIST OF REFERENCE NUMERALS

1 Pot
2 Second part
3 Plant
4 Spacing ring
5 Water
6 Base
7 First pipe section
8 Disk
9 Hole
10 Second pipe section
11 Culture substrate
12 Third pipe section
13 Opening

The invention claimed is:

1. A container for cultivating plants, especially herbs, wherein the container is comprised of at least one pot as a first part for water, and a second part made of a ceramic for culture substrate, that the second part has an unglazed, and therefore porous, base, an externally glazed first pipe section with an unglazed, and therefore porous, internal surface, a glazed disk with a hole and a glazed second pipe section,
wherein a largest cross section of the first pipe section is smaller than a smallest cross section of the second pipe section and no water can escape outwards through the glazed disk and the glazed second pipe section, the first pipe section is arranged in the at least one pot, the glazed disk is arranged over the at least one pot, and there is water in the at least one pot and culture substrate in said second part,
wherein a third pipe section pointing towards a floor of the at least one pot is arranged on the base of the second part, a largest cross section of the third pipe section is smaller than a smallest cross section of the first pipe section, and the third pipe section is made of an unglazed ceramic, and
wherein, when the at least one pot is filled with water, the third pipe section is in the water.

2. The container according to claim 1, wherein the at least one pot is made of a ceramic or a plastic.

3. The container according to claim 1, wherein the at least one pot is made of a plastic that is transparent for visible light, at least in certain areas.

4. The container according to claim 1, wherein the second part is designed in one piece with the third pipe section.

5. The container according to claim 1, wherein a spacing ring is located on the at least one pot and between the at least one pot and the glazed disk.

6. The container according to claim 1, wherein the container has a round or polygonal cross section.

7. The container according to claim 1, wherein there is at least one opening in a wall of the third pipe section.

* * * * *